United States Patent
Kerger (10) Patent No.: US 6,640,829 B1
(45) Date of Patent: Nov. 4, 2003

(54) VALVE FOR A TAP OF A COMPRESSED OR LIQUIFIED GAS CYLINDER, AND TAP PROVIDED WITH SUCH A VALVE

(75) Inventor: Loll Kerger, Mondorf-les-Bains (LU)

(73) Assignee: Torrent Trading Ltd., Tortola (VG)

( * ) Notice: Subject to any disclaimer, the term of this patent is extended or adjusted under 35 U.S.C. 154(b) by 0 days.

(21) Appl. No.: 10/173,913

(22) Filed: Jun. 18, 2002

(51) Int. Cl.[7] .................. F16K 31/24; F16K 31/34; F16K 33/00
(52) U.S. Cl. .............. 137/413; 137/442; 137/446; 137/613; 137/614.2; 141/18; 141/95; 141/198; 141/213
(58) Field of Search .................. 137/210, 413, 137/414, 434, 442, 443, 444, 446, 613, 614.19, 614.2; 141/18, 95, 198, 206, 210, 213, 214, 216, 229; 62/50.4, 50.7

(56) References Cited

U.S. PATENT DOCUMENTS

| | | | |
|---|---|---|---|
| 5,282,496 A | * 2/1994 | Kerger | 137/446 |
| 5,460,197 A | * 10/1995 | Kerger et al. | 137/413 |
| 5,487,404 A | 1/1996 | Kerger | |
| 5,842,500 A | * 12/1998 | Rockwood et al. | 137/413 |
| 6,138,709 A | * 10/2000 | Home | 137/446 |
| 6,178,994 B1 | * 1/2001 | Park | 137/446 |

* cited by examiner

Primary Examiner—George L. Walton
(74) Attorney, Agent, or Firm—Polster, Lieder, Woodruff & Lucchesi, L.C.

(57) ABSTRACT

A two-way valve is disclosed comprising at least two lateral openings which can be shut off by a piston provided with an axial orifice for the passage of gas, which piston slides axially in the casing between a position in which the openings are shut off under the influence of a spring and an open position counter to the action of the spring under the influence of the pressure of the filling gas, and a level valve activated by a float at the bottom of the casing. In order to prevent pressure from building up inside the casing after closure, the latter is provided with vent orifices. A seal member is arranged on the piston to cover or uncover the vent orifices.

24 Claims, 4 Drawing Sheets

VALVE FOR A TAP OF A COMPRESSED OR LIQUIFIED GAS CYLINDER, AND TAP PROVIDED WITH SUCH A VALVE

BACKGROUND OF THE INVENTION

The present invention relates to a two-way valve for a tap of a gas cylinder, said valve being intended to be fitted on a selectively openable gas inlet/outlet passage of said tap, said two-way valve permitting both filling and discharging gas into and from the cylinder, respectively, and comprising a casing having a gas flow passage and at least one lateral opening formed in a casing wall; a piston means disposed in said casing and having a gas flow passage therethrough communicating with said casing passage, resiliently yieldable means for moving the piston means to a closed position wherein the opening is sealed off from said casing passage, and said piston means being movable by the pressure of the filling gas against the action of the resiliently yieldable means to an open position in which the lateral opening is in communication with the casing passage; a level controlling valve movable between open and closed positions and, when in said open position, permitting gas to flow between the gas cylinder and the inlet/outlet passage through said casing and piston passages; means for detecting the filling level in the gas cylinder and for actuating the level controlling valve in response to said level, said level controlling valve, when not held in an open position by said detecting means, being openable by the pressure of the gas in the cylinder when the inlet/outlet passage is open; at least one vent orifice formed through said casing wall; and seal means to block communication through said orifice between the casing passage and the environment surrounding the casing in the gas cylinder when the pressure in the casing passage is below a predetermined value and to establish such communication through said orifice when the pressure in the casing passage is above said predetermined value and while the piston means in the closed position. The invention also relates to a tap provided with such a two-way valve.

A gas tap with such a two-way valve is disclosed in the U.S. Pat. No. 5,487,404 issued on Jan. 30, 1996 to L. Kerger, which is incorporated herein by reference. As described in this prior US patent when the tap is closed after the level controlling valve has been closed by the action of the float, a certain volume of gas remains trapped inside the valve and the inlet pipe of the tap and causes a danger of explosion in the event of overheating. In order to avoid such a danger a vent orifice has been provided in the wall of the valve casing which allows this gas volume to flow into the cylinder after closing of the tap so as to be within the field of action of the tap safety valve. The cross-section of this vent orifice must be small so that a sufficient pressure may build up within a valve chamber between the sealing device and the level controlling valve, after the level controlling valve has been closed, to cause the sealing device to move into a position closing the lateral openings. Despite the small vent orifice, it nevertheless has a negative influence on the speed of closure of the valve piston and therefore, in the above mentioned U.S. Pat. No. 5,487,404 to L. Kerger the orifice is associated with an outer resilient sealing ring disposed about the valve casing on the outer surface thereof, which resists the maximum filling pressure in order to ensure the leak tight closure of the orifice and which yields at a pressure greater than the filling pressure in order to open the orifice to permit discharge of the enclosed gas volume from the valve chamber into the cylinder when the pressure increases beyond a certain threshold value in the valve chamber. The sealing device of the valve disclosed in the above mentioned U.S. Pat. No. 5,487,404 to L. Kerger has two further sealing rings one of which providing leak tight engagement between the valve piston and the surrounding casing wall and the other cooperating with a seating surface of the valve casing and leak tightly engaging the seating surface in the closed position of the valve piston. The three sealing rings increase the complexity of the valve structure and the outer seal ring may be inadvertently damaged or even lost prior to assembly of the valve with a gas cylinder.

SHORT SUMMARY OF THE INVENTION

In accordance with the invention the seal means blocking and establishing communication between the casing passage and the environment surrounding the casing is on said piston means and movable therewith and is in leak tight slideable engagement with an inner surface of said casing wall, said seal means being effective to block and establish communication between said vent orifice and the casing passage when the pressure in said passage is below and above said predetermined value, respectively, and while the piston means is in the closed position.

Accordingly, the seal means on the piston means providing fluid tight engagement between the piston means and the surrounding casing wall inner surface is at the same time the seal means to block or establish communication between the interior casing chamber and the environment surrounding the valve casing in the gas cylinder, thereby eliminating one seal means and simplifying the overall construction of the two-way valve. In addition, the seal means blocking or establishing communication between the orifice or orifices and the casing passage is now in the interior of the valve casing and accordingly the risk of loss or undesired damage to the seal means is eliminated.

In one particular embodiment the piston means is adapted to be urged in response to the pressure in the casing passage exceeding the predetermined value an additional increment of movement in closing direction to a venting position in which the lateral opening remains sealed off and the vent opening is in communication with the casing passage. In this embodiment the piston means has a further seal means adapted to leak tightly engage a seating surface in the interior of the casing in the closed position of the piston means and the further seal means is of an elastomeric material resisting movement of the piston means to the venting position when the pressure in the casing passage is below the predetermined value and being elastically yieldable to permit movement of the piston means to the venting position when the pressure in the casing passage exceeds the predetermined value. Preferably the seating surface is a tapered seating surface and the further seal means has a tapered sealing surface that is non-parallel to the tapered seating surface. The angle of taper of the sealing surface may be smaller than the angle of taper of the seating surface. In the preferred embodiment the piston means has an annular body member and the first mentioned seal means comprises a flexible annular sealing lip extending from the annular body member of the piston means and diverging radially outwardly to leak tightly engage the casing inner surface as it extends away from the piston means body member. Further, the first mentioned seal means and the further seal means are preferably integral portions of a unitary seal member having the first mentioned seal means and the further seal means located on opposite end faces of the piston means body member and having an annular intermediate section interconnecting the two seal means and snugly matching an inner wall of the piston means body member.

The unitary seal member is preferably bonded by vulcanization to the piston means body member.

The first mentioned seal means may be elastically yieldable and collapsible towards the piston means body member when exposed to a pressure in the casing passage exceeding the predetermined value to assist in establishing the communication between the vent orifice and the casing passage.

In another embodiment, the communication between the vent orifice and the casing passage is established solely by the first mentioned seal means yielding or collapsing towards the piston means body member when exposed to a pressure in the casing passage exceeding the predetermined pressure. In this modified embodiment the piston means is not movable to a venting position, but only yielding or collapsing of the first mentioned seal means controls opening and closing of the vent orifice to establish or block the communication between the vent orifice and the casing passage.

It can be seen that in one embodiment three different seal ring means of the prior art valve structure have been replaced by a single unitary seal member which serves to tightly engage the interior cylindrical wall surface of the valve casing, which serves as valve sealing means to tightly engage the valve seat in the closed position, and which serves to cover or uncover the vent orifice in the valve casing.

SHORT DESCRIPTION OF THE DRAWINGS

Other features of the invention will become apparent from an advantageous embodiment described below by way of example with reference to the drawing figures, wherein.

BEST MODE FOR CARRYING OUT THE INVENTION

Figure 1:
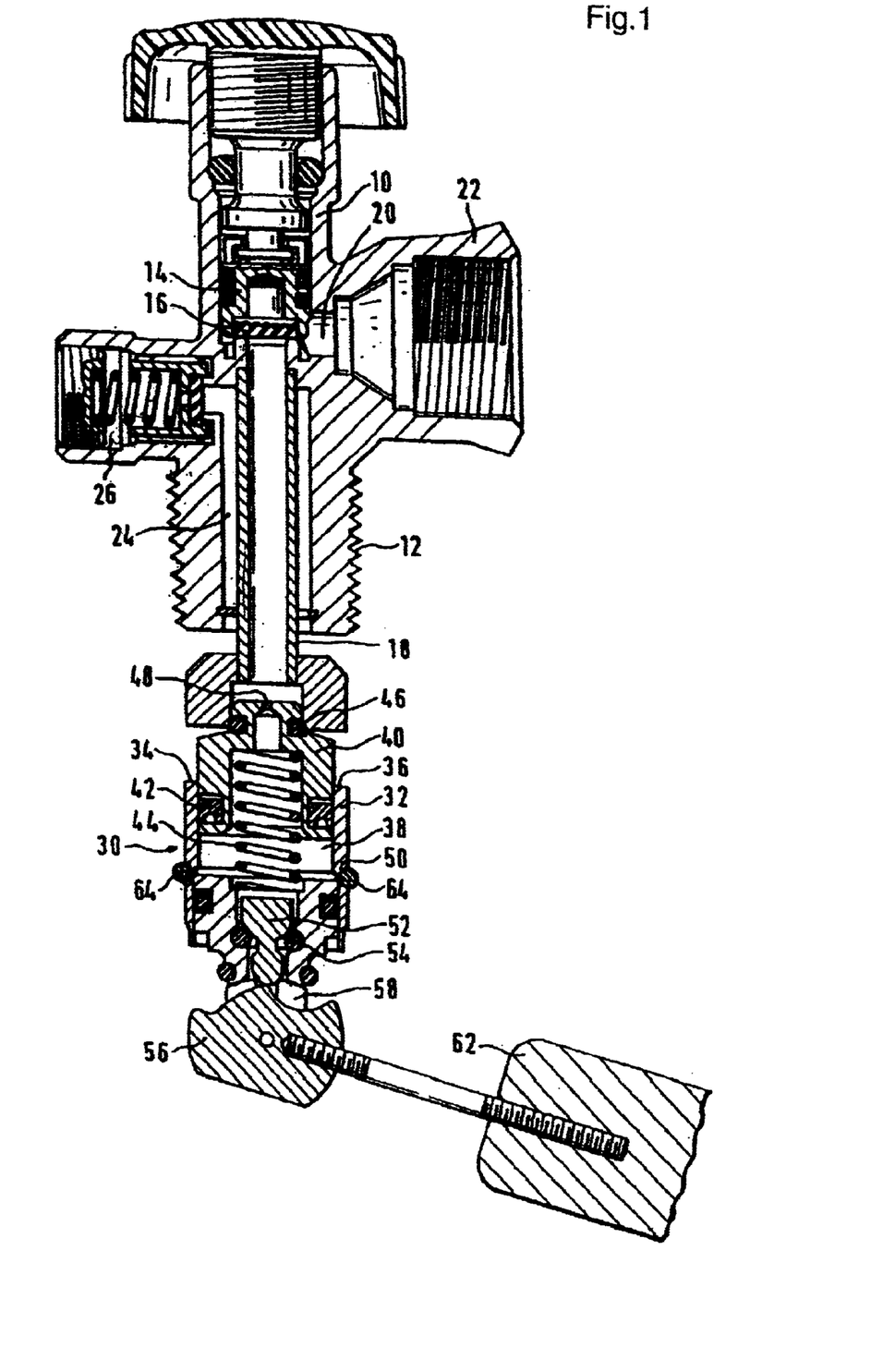
FIG. 1 shows the gas tap with the two-way valve according to the state of the art as disclosed in U.S. Pat. No. 5,487,404.

The known tap illustrated in FIG. 1 comprises a metal body 10, for example made from brass, the lower part of which is provided with a thread 12 allowing the tap to be screwed onto a gas cylinder. The tap comprises a closure member 14 with a seal 16 at the intersection of an axial inlet/outlet tube 18 communicating with the inside of the cylinder, and a radial inlet/outlet port 20 communicating with a connecting socket 22 which can be connected to a use circuit. The closure member 14 is activated manually using a lever or an operating wheel.

A passage 24 which establishes communication between the inside of the cylinder and a safety valve 26 is situated around the inlet/outlet tube 18. This valve 26 allows gases to escape in the event of an abnormal excess pressure of the gas inside the cylinder. To this end, the passage 24 must obligatorily be in the gaseous zone, i.e. the cylinder cannot be filled up to the body 10 of the tap.

The inlet/outlet tube 18 is connected, inside the cylinder, to a two-way valve 30 which enables the gas cylinder to be both filled and emptied. This valve 30 comprises a tubular casing 32 having two lateral openings 34 and 36. Inside this casing 32 is formed a cylindrical chamber 38 containing an annular plug 40 in the form of a piston which can slide axially and the sealing contact of which with the casing 32 is ensured by an O-ring 42. This piston 40 is subject to the action of a spring 44 which tends to maintain the piston 40 in the position shown in FIG. 1, in which its head is held, via a seal 46, leak tightly against the edge of the casing 32 in order to close the two lateral openings 34, 36 of the casing 32. The chamber 38 communicates with the tube 18 via an axial passage 48 through the piston 40.

The lower part of the valve 30 consists of the level valve 52. This valve 52 can slide axially between an open position freeing an annular passage for the gases between the casing 32 and the periphery of the valve 52 and a closed position in which the valve 52 is held leak tightly via a seal 54 against the lower part of the casing 32, forming the seat for this valve 52.

The valve 52 comprises a rounded foot which interacts with a cam 56 mounted pivotably in a clevis joint 58 of the casing 32. This cam 56 has a profiled contour designed so as to cause the valve 52 to move axially by its foot sliding along this profiled contour. The cam 56 is caused to pivot by a float 62 as the level of the liquefied gas in the cylinder rises and falls.

When the cylinder is empty, the float 62 is in a lower position, whilst the level valve 52 is in a raised and open position under the influence of the cam 56. The connecting socket 22 is connected to a gas source with a view to filling the cylinder, and the closure member 14 is opened by the operating wheel. The gas enters under pressure through the tube 18 and, as a result of its pressure, depresses the piston 40 against the action of the spring 44, thus freeing the two lateral openings 34 and 36 for the gas to pass into the cylinder.

The gas also enters through the passage 48 of the piston 40 and flows around the valve 52, in the open position, into the cylinder. A build-up of pressure in the chamber 38 must be prevented, as pressurization of said chamber 38 would be liable to cause the piston 40 to rise up and close the two lateral openings 34 and 36. To this end, the cross-section of the annular passage for gas flow around the valve 52 is greater than the cross-section of the passage 48 in order to prevent the gas in the chamber 38 from being compressed.

When the float 62 pivots, as a result of the cylinder being filled, in an anticlockwise direction beyond the angular position in the figure, the cam 56 releases the valve 52 to engage the seal 54 under the pressure of the filling gas. As soon as the valve 52 is closed, the increase in the pressure inside the chamber 38, combined with the action of the spring 44, causes the piston 40 to rise up and close the passage for the gas through the openings 34 and 36 and thus terminate the filling process.

To discharge gas from the cylinder, the tap is opened by rotating its operating wheel. When the cylinder is completely full and the level valve 52 is closed, the flow of the gas from the chamber 38 and from the tube 18 lowers the pressure in this chamber 38 and allows the pressure of the gas in the cylinder to lift the level valve 52 into an open position. The gas can then flow around the valve 52 and escape through the passage 48 of the piston 40. Once the level of the liquid gas in the cylinder has fallen as far as the position of the float 62 in FIG. 1, the valve 52 is held open by the circular cross-section of the profiled contour of the cam 56 and there is nothing to prevent the flow of gas through the valve 30 each time the tap is opened.

The feature of this tap is consequently that it stops the filling operation automatically without requiring the attention or intervention of the user, and does so by means of a two-way valve 30 enabling the cylinder to be emptied via the level valve 52 and in accordance with the safety regulations which dictate that the entire gaseous zone must be situated within the field of action of the safety valve 26.

In order to prevent liquid gases from being trapped in the tube 18 and in the chamber 38 after the level valve 52 has been closed, which gases would be situated beyond the zone of action of the safety valve 26, one or more vent orifices 50 have been provided in the wall of the casing 32 establishing communication between the inside of the cylinder surrounding the casing exterior and the inside of the chamber 38 and of the tube 18.

A seal means is associated with the vent orifices 50 to keep the orifices closed until a predetermined pressure higher than the maximum filling pressure is reached and exceeded. The seal means consists of an O-ring 64 made from resilient rubber which is housed in a groove around the casing 32, into which groove the orifice opens.

The improved two-way valve 130 according to the invention will now be described with reference to FIGS. 2 and 3, wherein only the two-way valve 130 is shown which includes the sealing device or piston 140, the level controlling valve 152 and the pivotably mounted float 162. The operation of the level controlling valve 152 and the pivoted float 162 are the same as described previously with respect to FIG. 1 and accordingly no further operation thereof is necessary.

The difference between the known valve of FIG. 1 and the valve 130 of the invention resides in the valve casing 132, the piston 140 of the valve sealing device as well as the arrangement of the vent orifice 150 in the valve casing 132 as will now be described.

The valve casing 132 has an interior downwardly facing conical or tapered seating surface 200 disposed above the two lateral openings 134, 136. The vent orifice 150 has been moved upwardly in the valve casing 132 to be closer to the lateral openings 134, 136 as in the prior art construction shown in FIG. 1. Again, one, two or more such vent orifices 150 may be provided around the circumference of the valve casing 132.

The valve piston 140 comprises an annular metal body member 202 and a single unitary seal member 204 in the form of a layer or coating of elastomeric material applied to and snugly matching the inner surface of the piston body member 202.

The single unitary seal member 204 has at its lower end a first downwardly and radially outwardly extending sealing lip 206 which depends downwardly from the piston body member 202 and leak tightly and axially slideably engages the interior cylindrical surface of the valve casing 132 below the lateral openings 134 and 136. The single unitary seal member 204 further has at its opposite or upper end a second radially outwardly and downwardly extending sealing lip 208 overlying a tapered outwardly and upwardly facing surface 210 at the upper end of the piston body member 202. The two sealing lips 206, 208 are on opposite ends of the piston body member 202 and are formed at opposite ends of an annular intermediate section 207 interconnecting the two sealing lips 206, 208 of the unitary seal member 204. The second sealing lip 208 is in cross-section thicker than the remaining portion of the single unitary seal member 204. The second sealing lip 208 has an outer tapered or conical sealing surface 212. The casing 132 and the piston 140 have a common longitudinal axis A and the sealing surface 212 of the second sealing lip 208 has a smaller angle of taper relative to the longitudinal axis A than the seating surface 200 in the interior of the casing 132. In other embodiments the seating surface 200 may have a smaller angle of taper than the sealing surface 212 of the second sealing lip 208 or one of the surfaces 200, 212 may be arcuate or dome-shaped or may have two angularly related surface sections. In general words, the seating surface 200 and the sealing surface 212 are non-parallel with respect to one another.

When the gas cylinder is being filled the gas pressure urges the sealing device or piston 140 downwardly against the force of the spring 144 to disengage the second sealing lip 208 from the seating'surface 200 to permit gas flow from the inlet passage 118 of the casing 132 through the lateral openings 134 and 136 into the gas cylinder. Gas flow also occurs through the central passage 148 in the valve piston 140 and through the casing chamber 138 and around the level controlling valve 152 into the interior of the gas cylinder. The inlet passage 118, the central passage 148 and the casing chamber 138 form a flow passage through the valve casing 132.

Figure 2:
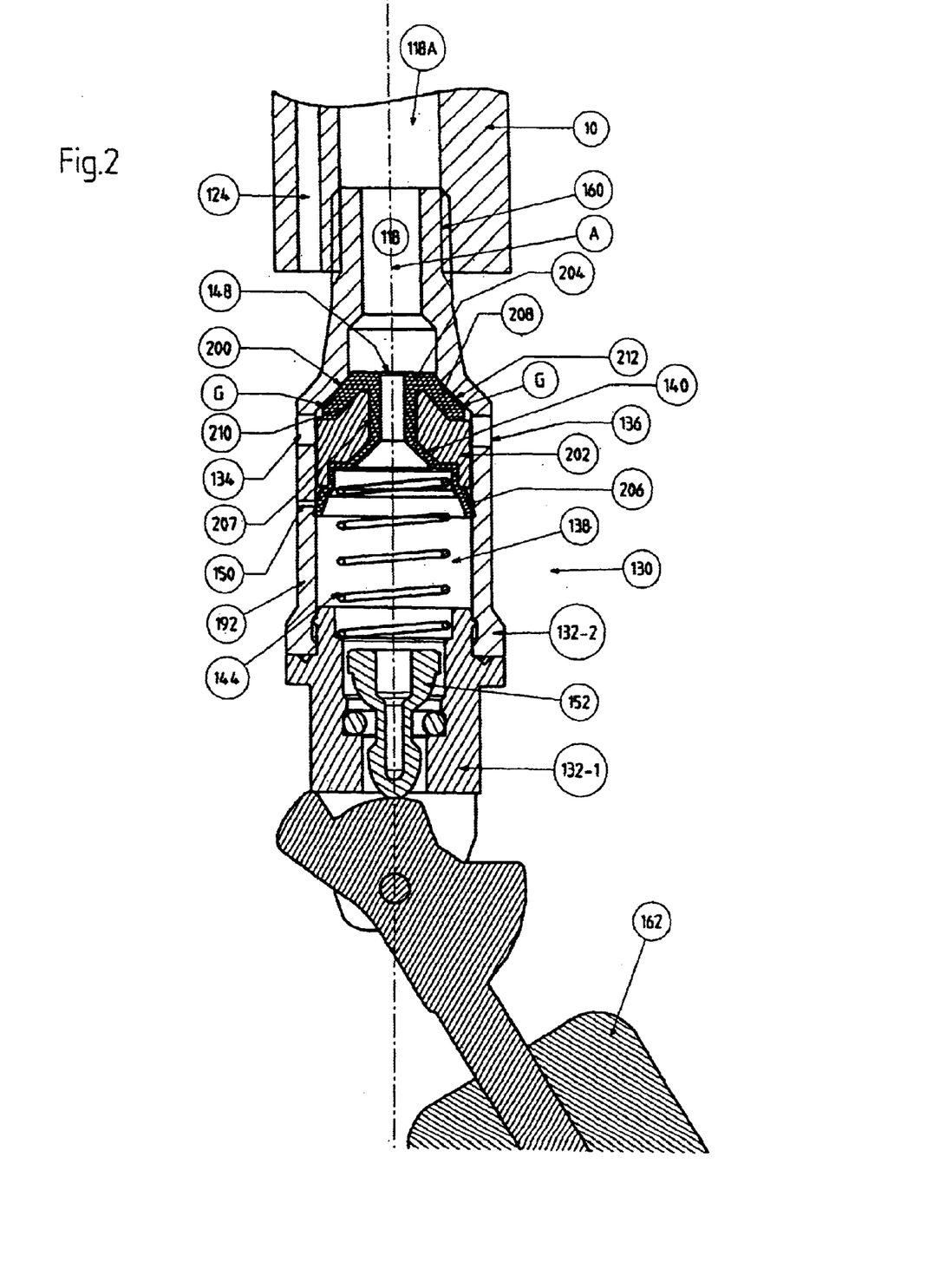
FIG. 2 shows the two-way tap according to the invention in the closed position under the effect of the maximum filling pressure.

When the float 162 has pivoted, as result of the gas cylinder being filled, to a position in which the level controlling valve 152 closes under the influence of the gas pressure within the chamber 138, the gas pressure increases in chamber 138 and causes, combined with the action of the spring 144, upward movement of the valve piston 140 until the sealing surface 212 of the second sealing lip 208 leak tightly engages the seating surface 200 adjacent the small diameter end thereof to terminate gas flow through the lateral openings 134 and 136, as shown in FIG. 2. In this closed position of the valve piston 140, shown in FIG. 2, the sealing surface 212 remains spaced from the seating surface 200 adjacent the large diameter and thereof. In effect, in this position, the major portions of the seating and sealing surfaces 200 and 212 are not in engagement with one another and, an outwardly opening wedge-shaped gap G is formed therebetween having its apex located adjacent the small diameter end of the seating and sealing surfaces 200 and 212, where the same are in leak tight engagement with one another. In another embodiment, wherein the angle of taper of the sealing surface 212 is larger than the angle of taper of the seating surface 200, the surfaces 200 and 212 would engage first adjacent the large diameter end thereof forming an inwardly opening wedge-shaped gap therebetween. In the above mentioned closed position and until the maximum filling pressure is reached and exceeded the first downwardly depending sealing lip 206 at the lower end of the valve piston 140 covers the vent opening or openings 150 and prevents fluid flow from the chamber 138 through the openings 150 into the interior of the gas cylinder. However, in case of overheating of the gas cylinder and pressure increase in the chamber 138 beyond an unsafe predetermined threshold value in the chamber 138 and the inlet/outlet passage 118 communicating therewith, the valve piston 140 is upwardly displaced by the increased pressure an additional increment of movement in the closing direction towards the seating surface 200 so that the first depending sealing lip 206 at the lower end of the valve piston 140 also moves upwardly a corresponding distance sufficient to uncover the vent orifice 150 and establish communication of orifice 150 with chamber 138 whereby the increased pressure from the chamber 138 may be released into the gas cylinder to be within the field of action of the safety valve 26.

Figure 3:
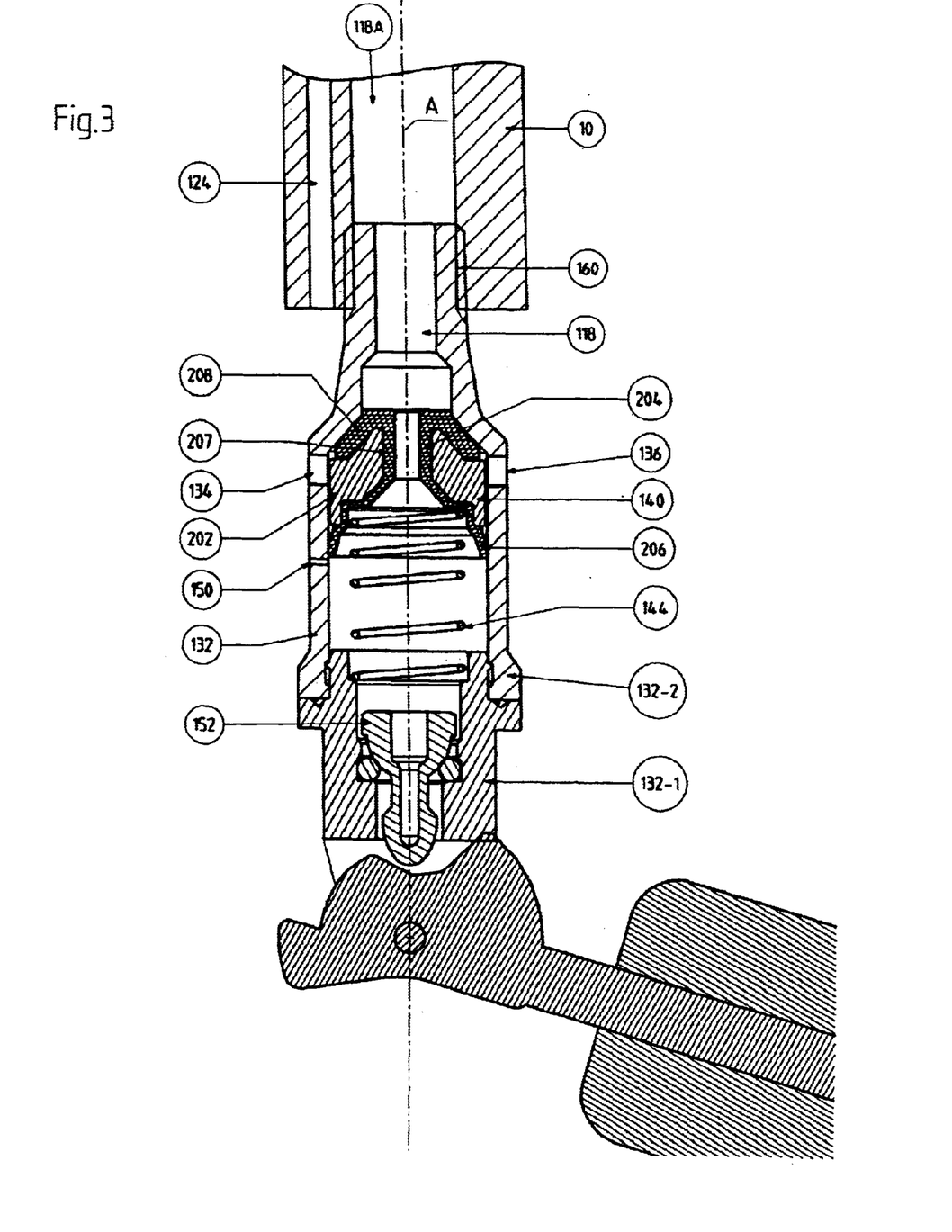
FIG. 3 is a similar view to FIG. 1 but showing the sealing device or piston of the valve tap under the higher pressure, wherein the vent orifice in the valve casing is uncovered and in communication with the casing interior.

This further upwardly moved position of the valve piston 140 is shown in FIG. 3, wherein it can be seen that the second sealing lip 208 has been elastically deformed to close the wedge-shaped gap G and generally the full surface area of the conical sealing surface 212 is now in contact with the seating surface 200 and the lower edge of the first sealing lip 206 has uncovered the vent orifice or orifices 150.

Accordingly, under maximum filling pressure the sealing surface 212 leak tightly engages the seating surface 200 providing a limited circumferential contact area therebetween and with the major portions of the seating and sealing surfaces 200, 212 remaining spaced from one another. Under the maximum filling pressure the elastomeric material of the seal member 204 resists further movement of the piston means 140 towards the seating surface 200 so that the sealing lip 206 remains in a position covering the vent orifice or orifices 150. When the pressure in the passage 118 and chamber 138 of the valve casing increases, the piston means 140 is forced with increasing force towards the seating surface 200 and the elastomeric material of the seal member 204 yields and the second sealing lip 208 becomes deformed progressively by the seating surface 200 forming a depression in the sealing surface 212 to progressively increase the contact area between the seating surface 200 and the sealing surface 212 and progressively reduce the wedge-shaped gap G as the piston 140 moves further upwardly in the valve casing 138 under the effect of the increased pressure in passage 118 and chamber 138. When the pressure in passage 118 and chamber 138 exceeds the predetermined threshold value the piston 140 is in its upward most position, wherein there is maximum area of contact between the seating surface 200 and the sealing surface 212 and the wedge-shaped gap G is fully closed due to maximum deformation of the second-sealing lip. In this position the seating surface 200 has formed a maximum depression in the second sealing lip 208 and the piston 140 has moved upward an additional increment, of movement in the closing direction towards the sealing surface 200, sufficient to uncover the vent orifice or orifices 150, so that the increased pressure in passage 118 and chamber 138 is released through the orifice or orifices 150 to the environment surrounding the valve casing 132 in the interior of the gas cylinder. When the pressure in passage 118 and chamber 138 has decreased to below the predetermined value the piston 140 is again moved downwardly by the deformation energy stored in the sealing lip 208 to return to its FIG. 2 position, wherein the sealing lip 208 is again in its non-deformed or, non-depressed position and the sealing lip 206 has again covered the orifice or orifices 150 to block communication of this orifice or orifices with chamber 138.

Assuming that the maximum filling pressure when the level valve 152 closes (in FIG. 2) is $12 \times 10^5$ Pa, the single unitary seal 204 is, for example, designed to remain in its normally closed position shown in FIG. 2, wherein the orifice 150 is covered by sealing lip 206, as long the pressure within the chamber 138 and the inlet/outlet passage or port 118 communicating therewith does not exceed $16 \times 10^5$ Pa. However, if for example following heating up, the pressure in the chamber 138 and the inlet/outlet passage or duct 118 exceeds the threshold of $16 \times 10^5$ Pa, the sealing valve piston 140 is moved further upwardly by deflection or deformation of the second sealing lip 208 until the orifice or orifices 150 are uncovered to release the increased pressure from chamber 138 and passage or port 118 into the interior of the gas cylinder.

Figure 4A:
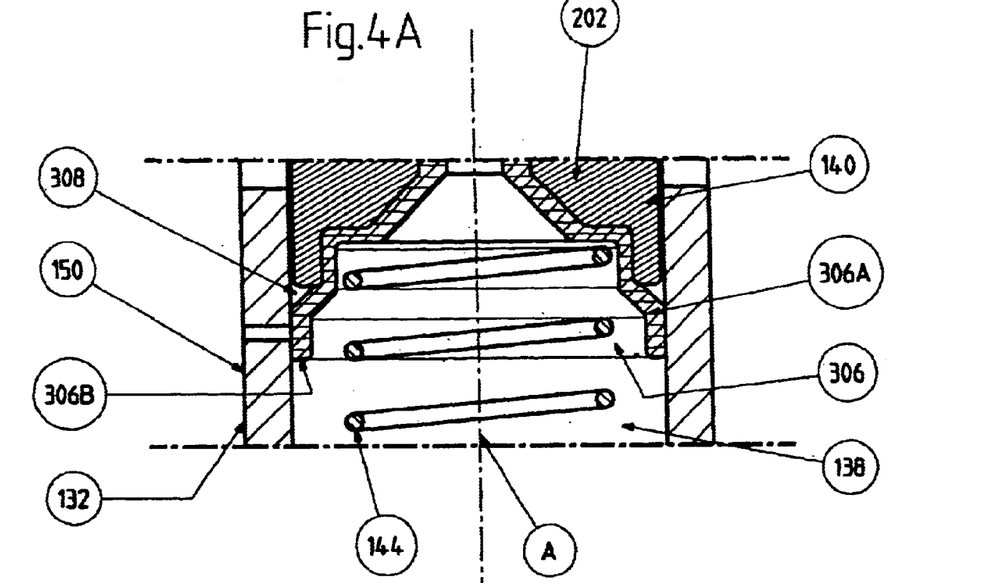
FIGS. 4A and 4B show a detail in cross-section of another embodiment of the vent orifice seal of the two-way valve, with, FIG. 4A showing the seal in a vent orifice blocking position and FIG. 4B showing the seal in a vent orifice open position.

Reference is now made to FIG. 4A which shows a modification of the sealing lip 206 cooperating with the orifice or orifices 150. This modified embodiment corresponds generally to the embodiments of FIGS. 2 and 3, with the exception that the modified sealing lip 306 is adapted to be deflected or urged upwardly relative to the body 202 of the piston 140 when the pressure in the chamber 138 exceeds the predetermined threshold value in order to assist in uncovering the orifice or orifices 150 when the piston 140 moves upwardly. The upwardly deformed or deflected position of the modified sealing lip 206 is shown in FIG. 4A.

Figure 4B:
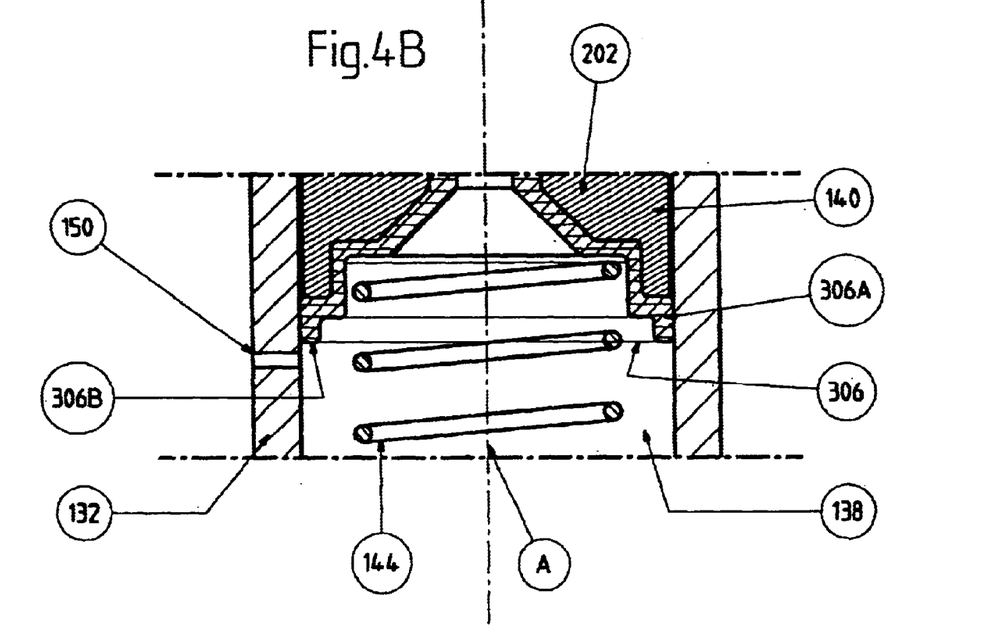

The modified sealing lip 306 has a downwardly and outwardly inclined leg portion 306A tapering away from the lower end of the piston body member 202 and an axially extending end leg 306B leak tightly engaging the casing inner wall. A generally triangular space 308 is formed between the piston body member 202 and the inclined leg portion 306A in the non-deflected position of the sealing lip 306, as shown in FIG. 4A. In the deflected position of the sealing lip 306, shown in FIG. 4B, the inclined leg portion 306A is deflected upwardly against the lower end of the piston body member 202. In this deflected position of the sealing lip 306, the sealing lip is collapsed to a smaller axial dimension in the direction of the casing longitudinal axis A. As in the previously described embodiment the elastomeric material of the sealing lip resists deflection or collapsing thereof as long as the pressure in casing passage 118 or chamber 138 does not exceed the predetermined threshold.

It is pointed out that in another embodiment this modified deflectable or collapsible sealing lip 306 cooperating with orifice or orifices 150 may also be used as the sole means to uncover the orifice or orifices 150 when the predetermined threshold pressure value is exceeded in valve chamber 138 to establish communication of the orifice or orifices 150 with valve chamber 138. Accordingly, in this embodiment under the effect of the pressure in chamber 138 being higher than the predetermined pressure value the valve piston 140 is not movable further towards the valve seat 200 into a venting position but only the modified sealing lip 306 is deflected relative to the piston body member 202 into a deflected or venting position in which the orifice or orifices 150 are uncovered and are in communication with valve chamber 138.

Accordingly, it can be seen that the overall structure of the gas valve has been simplified, eliminating the seal ring 64 of the prior art gas valve of FIG. 1 and, in the preferred embodiment, replacing the two sealing rings 42 and 46 on the prior art valve piston 40 by a single unitary seal member 204 having two sealing lips 208 and 206, namely a first sealing lip 206 to tightly seal against the interior cylindrical surface of valve casing 132 and to cover or uncover the vent openings 150 and a second sealing lip 208 cooperating with the tapered seating surface 200 in the interior of the valve casing 132. Preferably, the single unitary seal member 204 consists of resilient rubber material that is bonded by vulcanization to the metal body 202 of the valve piston 140, which may be a brass body 202.

Additional differences between the valve of the invention shown in FIGS. 2 and 3 and the prior art valve shown in FIG. 1 are the two-part casing 132 of the valve according to the invention, comprising a lower casing portion 132-1 in which the level valve 152 is arranged and which is connected to the lower end portion of an upper part 132-2 of the valve casing 132 containing the valve piston 140.

Further, the upper end of the upper portion 132-2 of the valve casing 132 is threaded at 160 into the body 10 of the gas tap whereby the inlet/outlet passage or port 118 of the casing 132 is in communication with a inlet/outlet passage or port 118A in the gas tap body 10. Further, the passage 124 providing communication between the safety valve 26 and the interior of the gas cylinder is not disposed coaxially around the inlet/outlet passages or ports 118 and 118A, but is radially spaced from.

It is pointed out that the invention is not limited to the above disclosed embodiments but many modifications or variations may be made thereto by one skilled in the art without departure from the scope of the invention.

I claim:

1. Two-way valve for a tap of a gas cylinder, said valve being intended to be fitted on a selectively openable gas inlet/outlet passage of said tap, said two-way valve permitting both filling and discharging gas into and from the cylinder, respectively, and comprising a casing having a gas flow passage and at least one lateral opening formed in a casing wall; a piston means disposed in said casing and having a gas flow passage therethrough communicating with said casing passage, resiliently yieldable means for moving the piston means to a closed position wherein the opening is sealed off from said casing passage, and said piston means being movable by the pressure of the filling gas against the action of the resiliently yieldable means to an open position in which the lateral opening is in communication with the casing passage; a level controlling valve movable between open and closed positions and, when in said open position, permitting gas to flow between the gas cylinder and the inlet/outlet passage through said casing and piston passages; means for detecting the filling level in the gas cylinder and for actuating the level controlling valve in response to said level, said level controlling valve, when not held in an open position by said detecting means, being openable by the pressure of the gas in the cylinder when the inlet/outlet passage is open; at least one vent orifice formed through said casing wall; and seal means to block communication through said orifice between the casing passage and the environment surrounding the casing in the gas cylinder when the pressure in the casing passage is below a predetermined value and to establish such communication through said orifice when the pressure in the casing passage is above said predetermined value and while the piston means in the closed position, characterized in that said seal means is on said piston means and movable therewith and is in leak tight slideable engagement with an inner surface of said casing wall, said seal means being effective to block and establish communication between said vent orifice and the casing passage when the pressure in said passage is below and above said predetermined value, respectively, and while the piston means is in the closed position.

2. Valve according to claim 1, wherein the piston means is adapted to be urged in response to the pressure in the casing passage exceeding said predetermined value an additional increment of movement in closing direction to a venting position in which said lateral opening remains sealed off and said vent orifice is in communication with said casing passage.

3. Valve according to claim 2, wherein the piston means has a further seal means adapted to leak tightly engage a seating surface in the interior of the casing in the closed position of the piston means, said further seal means being of an elastomeric material resisting movement of the piston means to said venting position when the pressure in said casing passage is below said predetermined value and being elastically yieldable to permit movement of said piston means to said venting position when the pressure in the casing passage exceeds said predetermined value.

4. Valve according to claim 3, wherein the seating surface is a tapered seating surface and the further seal means has a tapered sealing surface that is non-parallel to the tapered seating surface.

5. Valve according to claim 4, wherein the angle of taper of the sealing surface is smaller than the angle of taper of the seating surface.

6. Valve according to claim 3, wherein the piston means has an annular body member and the casing has an inner annular wall having an inner wall surface and the first mentioned seal means comprises a flexible annular sealing lip extending from the annular body of the piston means and diverging radially outwardly to leak tightly engage the casing wall inner surface as it extends away from the piston means body.

7. Valve according to claim 6, wherein the piston means body member has an inner annular wall and wherein the first mentioned seal means and the further seal means are integral portions of a unitary seal member having said first mentioned seal means and said further seal means located on opposite end faces of said piston means body member and having an annular intermediate section interconnecting both seal means and snugly matching the inner wall of the piston wall means body member.

8. Valve according to claim 7, wherein said unitary seal member is bonded by vulcanization to the piston means body member.

9. Valve according to claim 2, wherein the piston means has a body member and wherein the first mentioned seal means is elastically yieldable and collapsible towards said body member when exposed to a pressure in said casing passage exceeding said predetermined value to assist in establishing the communication between the vent orifice and the casing passage, said first mentioned seal means being of an elastomeric material that resists collapsing thereof when said pressure in said casing passage is below said predetermined pressure.

10. Valve according to claim 1, wherein the piston means has a body member and wherein said seal means is elastically yieldable and collapsible towards said body member when exposed to a pressure in said casing passage exceeding said predetermined pressure to establish communication between the vent orifice and the casing passage, said seal means being of an elastomeric material that resists collapsing thereof when said pressure in said casing passage is below said predetermined pressure.

11. Valve according to claim 10, wherein said piston body member has an inner annular wall, wherein the piston means has a further seal means adapted to leak tightly engage a seating surface in the interior of the casing in the closed position of the piston means, and wherein the first mentioned seal means and the further seal means are integral portions of a unitary seal member having said first mentioned seal means and said further seal means located on opposite end faces of said piston means body member and having an annular intermediate section interconnecting both seal means and snugly matching the inner annular wall of the piston means body member.

12. Valve according to claim 11, wherein said unitary seal member is bonded by vulcanization to said piston means body member.

13. Gas tap comprising a tap body designed to be fitted on a gas cylinder and having an inlet/outlet passage, a closure member for opening and closing said channel, means for manoeuvring the closure member, a safety valve, and a two-way valve communicating with said channel to permit both filling and discharging gas into and from the cylinder, respectively, said valve comprising a casing with at least one lateral opening formed in a casing wall; a piston means disposed in said casing and having a gas flow passage therethrough communicating with said casing passage, resiliently yieldable means for moving the piston means to a closed position wherein the opening is sealed off from said casing passage, and said piston means being movable by the pressure of the filling gas against the action of the resiliently yieldable means to an open position in which the lateral opening is in communication with the casing passage; a level controlling valve movable between open and closed positions and, when in said open position, permitting gas to flow between the gas cylinder and the inlet/outlet passage through said casing and piston passages; means for detecting the filling level in the gas cylinder and for actuating the level controlling valve in response to said level, said level controlling valve, when not held in an open position by said detecting means, being openable by the pressure of the gas in the cylinder when the inlet/outlet passage is open; at least one vent orifice formed through said casing wall; and seal means to block communication through said orifice between the casing passage and the environment surrounding the casing in the gas cylinder when the pressure in the casing passage is below a predetermined value and to establish such communication through said orifice when the pressure in the casing passage is above said predetermined value and while the piston means in the closed position, characterized in that said seal means is on said piston means and movable therewith and is in leak tight slideable engagement with an inner surface of said casing wall, said seal means being effective to block and establish communication between said vent orifice and the casing passage when the pressure in said passage is below and above said predetermined value, respectively, and while the piston means is in the closed position.

14. Gas tap according to claim 13, wherein the piston means is adapted to be urged in response to the pressure in the casing passage exceeding said predetermined value an additional increment of movement in closing direction to a venting position in which said lateral opening remains sealed off and said vent orifice is in communication with said casing passage.

15. Gas tap according to claim 14, wherein the piston means has a further seal means adapted to leak tightly engage a seating surface in the interior of the casing in the closed position of the piston means, said further seal means being of an elastomeric material resisting movement of the piston means to said venting position when the pressure in said casing passage is below said predetermined value and being elastically yieldable to permit movement of said piston means to said venting position when the pressure in the casing passage exceeds said predetermined value.

16. Gas tap according to claim 15, wherein the seating surface is a tapered seating surface and the further seal means has a tapered sealing surface that is non-parallel to the tapered seating surface.

17. Gas tap according to claim 16, wherein the angle of taper of the sealing surface is smaller than the angle of taper of the seating surface.

18. Gas tap according to claim 15, wherein the piston means has an annular body member and the casing has an inner annular wall having an inner wall surface and the first mentioned seal means comprises a flexible annular sealing lip extending from the annular body of the piston means and diverging radially outwardly to leak tightly engage the casing wall inner surface as it extends away from the piston means body.

19. Gas tap according to claim 18, wherein the piston means body member has an inner annular wall and wherein the first mentioned seal means and the further seal means are integral portions of a unitary seal member having said first mentioned seal means and said further seal means located on opposite end faces of said piston means body member and having an annular intermediate section interconnecting both seal means and snugly matching the inner wall of the piston all means body member.

20. Gas tap according to claim 19, wherein said unitary seal member is bonded by vulcanization to the piston means body member.

21. Gas tap according to claim 14, wherein the piston means has a body member and wherein the first mentioned seal means is elastically yieldable and collapsible towards said body member when exposed to a pressure in said casing passage exceeding said predetermined value to assist in establishing the communication between the vent orifice and the casing passage, said first mentioned seal means being of an elastomeric material that resists collapsing thereof when said pressure in said casing passage is below said predetermined pressure.

22. Gas tap according to claim 13, wherein the piston means has a body member and wherein said seal means is elastically yieldable and collapsible towards said body member when exposed to a pressure in said casing passage exceeding said predetermined pressure to establish communication between the vent orifice and the casing passage, said seal means being of an elastomeric material that resists collapsing thereof when said pressure in said casing passage is below said predetermined pressure.

23. Gas tap according to claim 22, wherein said piston body member has an inner annular wall, wherein the piston means has a further seal means adapted to leak tightly engage a seating surface in the interior of the casing in the closed position of the piston means, and wherein the first mentioned seal means and the further seal means are integral portions of a unitary seal member having said first mentioned seal means and said further seal means located on opposite end faces of said piston means body member and having an annular intermediate section interconnecting both seal means and snugly matching the inner annular wall of the piston means body member.

24. Gas tap according to claim 23, wherein said unitary seal member is bonded by vulcanization to said piston means body member.

* * * * *

UNITED STATES PATENT AND TRADEMARK OFFICE
CERTIFICATE OF CORRECTION

PATENT NO. : 6,640,829 B1
DATED : November 4, 2003
INVENTOR(S) : Loll Kerger

It is certified that error appears in the above-identified patent and that said Letters Patent is hereby corrected as shown below:

Column 3,
Line 1, replace ""vulcanization"" with -- vulcanisation --

Column 6,
Line 16, replace "seating'surface" with -- seating surface --
Line 39, between "and" and "an", remove ","

Column 7,
Line 34, replace "second-sealing" with -- second sealing --
Line 37, between "increment" and "of", remove ","
Line 39, between "150" and "so", remove ","
Line 47, between "or" and "non-depressed, remove ","

Column 8,
Line 54, replace "vulcanization" with -- vulcanisation --

Column 10,
Lines 24 and 58, replace "vulcanization" with -- vulcanisation --

Column 11,
Line 10, between "and" and "when", remove ","

Column 12,
Line 18, replace "all" with -- wall --
Line 20, replace "vulcanization" with -- vulcanisation --
Line 54, replace "vulcanization" with -- vulcanisation --

Signed and Sealed this

Fifth Day of April, 2005

JON W. DUDAS
*Director of the United States Patent and Trademark Office*